United States Patent
Crevecoeur et al.

(10) Patent No.: US 6,242,540 B1
(45) Date of Patent: Jun. 5, 2001

(54) PROCESS FOR THE PREPARATION OF POLYMER PARTICLES

(75) Inventors: Jeroen Joost Crevecoeur, Eindhoven; Eric Wilhelmus Johannes Frederik Neijman, Breda; Laurentius Nicolaas Ida Hubertus Nelissen, Eindhoven; Johannes Maria Zijderveld, Breda, all of (NL)

(73) Assignee: Nova Chemicals (International) S.A., Fribourg (CH)

( * ) Notice: Subject to any disclaimer, the term of this patent is extended or adjusted under 35 U.S.C. 154(b) by 0 days.

(21) Appl. No.: 09/214,257

(22) PCT Filed: Mar. 7, 1997

(86) PCT No.: PCT/EP97/03609

§ 371 Date: Dec. 28, 1998

§ 102(e) Date: Dec. 30, 1998

(87) PCT Pub. No.: WO98/01488

PCT Pub. Date: Jan. 15, 1998

(30) Foreign Application Priority Data

Jul. 4, 1996 (NL) .................................................. 96201905

(51) Int. Cl.$^7$ ................................. C08F 2/18; C08J 9/20
(52) U.S. Cl. ............................. 526/73; 526/88; 526/240; 526/287; 526/318.6; 526/347; 524/457; 524/458; 524/817; 524/819; 521/56; 521/146; 521/147

(58) Field of Search ................................. 521/56, 88, 147, 521/146; 524/458, 755, 817, 836, 457, 819; 526/73, 88, 287, 318.6, 347

(56) References Cited

U.S. PATENT DOCUMENTS

| 5,043,404 | 8/1991 | Mahababi et al. . |
| 5,240,967 | * 8/1993 | Sonnenberg et al. .............. 521/56 X |

FOREIGN PATENT DOCUMENTS

| 844652 | 6/1970 | (CA) . |
| 1106143 | * 3/1968 | (GB) . |
| 60-206846 | 10/1985 | (JP) . |

OTHER PUBLICATIONS

Derwent abstract accession No. 85–299665/48.

* cited by examiner

*Primary Examiner*—Fred Teskin
(74) *Attorney, Agent, or Firm*—Kenneth H. Johnson

(57) ABSTRACT

Particles of a copolymer of a vinyl arene and a copolymerizable compound containing a polar moiety and a vinyl moiety containing water may be prepared by forming a mixture of monomers and small amounts of water and polymerizing under agitation to 20 to 70% conversion and then suspending the mass in water and finishing the polymerization. The resulting polymer beads contain finely dispersed water which is useful as an environmentally acceptable blowing agent.

9 Claims, No Drawings

PROCESS FOR THE PREPARATION OF POLYMER PARTICLES

The present invention relates to a process for the preparation of polymer particles containing a polymer of a vinylarene monomer and a physical foaming agent, and to such polymer particles and foamed articles.

Particles that contain such a polymer and foaming agent are generally known as expandable polymer particles. A well-known type of expandable polymer particles is expandable polystyrene. Expandable polystyrene is produced on a commercial scale by suspension polymerisation. The foaming agent is usually a low-boiling hydrocarbon, such as a $C_3$–$C_8$ hydrocarbon, in particular pentane isomers. The expandable polystyrene is used for making foamed articles that are produced by expanding the polystyrene particles. In the expansion process the hydrocarbon foaming agent is released and may be emitted into the environment. Such emissions are regarded undesirable and ways are sought to avoid such emissions. One way is to recover or burn the emitted hydrocarbon. Another way is to reduce the amount of hydrocarbon foaming agent in the expandable polymer particles.

In U.S. Pat. No. 5,096,931 expandable polystyrene is described which contains polystyrene, a small amount of a polar polymer, some water and a reduced amount of hydrocarbon foaming agent. Although the content of hydrocarbon foaming agent has been reduced such agent must still be present to achieve satisfactory expansion.

GB-A-1,106,143 discloses a process for preparing water-expandable polystyrene particles by mixing by vigorous mechanical agitation styrene monomer, water and an emulsifier with a free-radical initiator to obtain an emulsion containing small droplets of water. Subsequently, the emulsion is suspended in an aqueous phase and the suspension obtained is subjected to polymerisation. In order to achieve a satisfactory excansion certain amounts of organic foaming agents are included.

In experiments to verify the merits of the teaching of the above patent GB-A-1,106,143 it was found that the finely dispersed water droplets obtained in the first emulsion tend to coalesce and form bigger droplets during polymerisation. In an experiment in GB-A-1,106,143 it is confirmed that droplets bigger than 40 $\mu$m cause unsatisfactory foamed articles after expansion. Vigorous agitation is apparently necessary in this known process to create and maintain the finely dispersed water droplets. However, it is awkward to stir in commercial operation at such high energy inout.

Hence, it would be desirable if the tendency of the water droplets to coalesce could be reduced.

Surprisingly, it was found that the tendency for the water droplets to grow could be reduced by creating a viscous water-containing emulsion before completely polymerising the vinylarene monomer in suspension polymerisation. This makes it possible to stir less vigorously.

Accordingly, the present invention relates to a process in which a viscous water-containing emulsion of vinylarene monomer is pre-polymerised before being suspended in an aqueous medium. The present invention relates to a process in which the emulsifier is prepared in-situ. The patent case claiming priority of European application No. 96201904.8 (WO 96/10547) relates to a process in which emulsifier is added.

The present invention provides a process for the preparation of polymer particles containing a vinylarene polymer by suspension pohymerisation, which process comprises:

a) preparing a pre-polymerised mass based on a vinylarene monomer, a copolymerisable compound containing a polar moiety and a vinyl moIety and water emulsified therein, by reacting the vinylarene monomer together with the copolymerisable compound such that the vinylarene monomer is pre-polymerised to a conversion degree of 20 to 70%;

b) suspending the pre-polymerised mass in an aqueous medium to yield suspended droplets, and c) polymerising the vinviarene monomer in the suspended droplets to complete monomer conversion to yield suspended polymer particles.

The present invention has the advantage that the in-situ prepared emulsifier has been found to be very effective. This makes that a substantial amount of water can be incorporated in the beads.

The present process is capable of yielding polymer particles with satisfactory expandability properties that do not contain an organic foaming agent. The process is therefore preferably conducted in the substantial absence of $C_3$–$C_6$ hydrocarbon foaming agent. In the substantial absence means in an amount less than 0.5% wt based on the amount of vinylarene monomer, preferably less than 0.25% wt, more preferably in the complete absence of such foaming agents.

In a further embodiment of the invention the polymer particles obtained are separated from the aqueous mixture and, optionally, expanded to yield pre-expanded particles which are optionally treated further to yield foamed articles. The present invention furthermore relates to expandable polymer particles based on a vinylarene monomer and 0.001 to 5% wt, based on the amount of vinylarene monomer, of a copolymerisable compound containing a polar moiety and a vinyl moiety, which polymer particles further contain 1–20% wt based on he weight of vinylarene monomer, of water emulsified therein.

The present invention also relates to foamed articles based on a polymer of a vinvlarene monomer and 0.001 to 5% wt, based on the amount of vinyl arene monomer, of a copolymerisable compound containing a polar moiety and a vinyl moiety.

The creating of the viscous, pre-polymerised mass is preferably carried out by bulk polymerisation of the vinylarene monomer to the desired degree. The emulsifier can be prepared in-situ in various ways. Preferably, the vinylarene, copolymerisable compound and water are mixed together, and subsequently subjected to prepolymerisation.

The copolymerisable compound can be selected from any compound which combines the two functionalities: a polar moiety and a vinyl moiety. Suitable compounds are styrene compounds with a polar moiety. The polar moiety is preferably derived from an acidic moiety, more particularly from an inorganic acidic moiety. Suitable examples include acrylic acid or salts thereof. Other preferred examples are polar styrene derivatives such as styrene sulphonic acid or a salt thereof.

In order to prepare the emulsifier, the mixture of copolymerisable compound and vinylarene compound preferably contains a phase transfer catalyst which enables copolymerisation. The phase transfer catalyst can be selected from a wide range of known compounds. For anionic polar moieties, suitable phase transfer catalysts are quaternary ammonium and/or phosphonium compounds. Preferable compounds include tetra-alkyl (e.g. with 1 to 15 carbon atoms) ammonium or phosphonium halides, such as tetra butyl ammonium bromide, tetra methyl ammonium chloride or trioctyl methyl ammonium chloride.

The emulsification can be achieved easily by stirring of the water and the other components of the emulsifying mixture. Suitable stirring is already carried out at an energy input equivalent to or less than 500 rotations per minute for a 70 l reactor, even at an energy input equivalent to or less than 350 rotations per minute for a 70 l reactor.

The amount of copolymerisable compound to be used is to some extent dependent on the amount of water to be emulsified. Suitably, the amount of copolymerisable compound ranges from 0.001 to 5% wt, based on the amount of vinylarene monomer. Preferred ranges are from 0.05 to 3, more preferred from 0.1 to 1.5% wt.

The amount of water to be emulsified which to some extent determines the desired amount of copolymerisable compound, can be chosen between wide ranges. Suitably the amount of water ranges from 1 to 20% wt, based on the weight of the vinylarene monomer. Well-expandable particles can be obtained when from 3 to 15% wt of water is emulsified. Below 1% wt the expandability may be too low, whereas at very high water contents the particles yield expanded articles that may run the risk of collapsing.

In the water to be emulsified an electrolyte may be included. Suitable electrolytes are alkali and alkaline earth salts, but other inorganic salts may equally well be used. The electrolyte may lead to a decrease in droplet size and may enhance the water-in-oil character of ionic surfactants. Therefore, it may be advantageous to use a water phase with from 0.5 to 5% wt of electrolyte, based on amount of water, especially when an ionic emulsifier is used. Preferred salts are alkali metal halides, such as NaCl and KCl.

The pre-polymerisation step may be conducted in any known manner. This includes free-radical polymerisation and thermal radical polymerisation. Thermal polymerisation can be effected by heating the emulsion to a temperature of 120 to 150° C. When the desired conversion has been achieved, the temperature is reduced. If the pre-polymerisation step is carried out by thermal radical polymerisation in the presence of water, the pre-polymerisation needs to be carried out at elevated pressure. This makes that in most cases it is preferred to pre-polymerise by free-radical polymerisation with the help of one or more free-radical initiators. For the same reasons, the polymerisation step c) is preferably effected by free-radical polymerisation. Pre-polymerisation by means of free-radical polymerisation can be carried out by adding an initiator to the vinylarene/water emulsion and starting the polymerisation by heating to 40–14° C. The prepolymerisation of step a) is preferably carried out by heating to 40–120° C. The polymerisation of step c) is preferably carried out by heating to 60–140° C. Free-radical polymerisation is suitably carried out at a pressure of 0.5 to 5 bar, preferably 0.7 to 1.5 bar, more preferably at atmospheric pressure. The further process conditions are well-known to the skilled artisan. Most preferably, the final stage of the polymerisation of step c) is carried out at elevated pressure and at a temperature of 110–140° C. in order to further reduce the amount of monomer present in the final product.

Optimal conversion degrees of the pre-polymerised mass may vary for different monomers. Suitably the conversion varies between 20 and 70% of the vinylarene monomer.

If the conversion is higher than 70%, the viscosity of the pre-polymerised mass may be so high that handling problems may occur. This may complicate suspending the pre-polymerised mass in the aqueous phase or the emulsification of water into the pre-polymerised mass. If the pre-polymerisation degree is lower than 20%, the suspended droplets will tend to be unstable. In that case, undesirably large amounts of aqueous suspension medium of large droplet size will be incorporated. This will lead to foam collapse during expansion. Preferably, the conversion varies between 30 and 60%.

In order to improve the expansion properties of the eventual polymer particles it is preferred to have cross-linking agent present during polymerisation. The cross-linking agent can be added in step a) and/or in step c). Preferably, the cross-linking agent is added in step a). Suitably, the cross-linking agent is selected from the group of compounds having at least two olefinic double bonds. Examples of such compounds include divinylbenzene, α,ω-alkadienes, e.g. isoprene, and the diester of acrylic acid or methacrylic acid with a diol, such as butanediol, pentanediol or hexanediol. Preferred for its compatibility with the vinylarene is divinylbenzene.

In order to obtain a significant cross-linking effect the amount of the cross-linking agent should not be too low. On the other hand, if the amount of cross-linking agent would be too high, the expandability of the eventual particles would deteriorate. A suitable range is from 0.01 to 5% wt, preferably from 0.01 to 1.5% wt, based on the amount of vinylarene monomer. Most preferably from 0.01 to 0.5% wt of cross-linking agent is used.

Further, it has been found to be advantageous to polymerise the vinylarene monomer in the presence of a polyphenylene ether. It has been found that the presence of polyphenylene ether reduces the chance that the foamed material collapses during cooling. Suitable polyphenylene ethers have been described in EP-A-350137, EP-A-403023 and EP-A-391499. The polyphenylene ether can be added in step a) and/or in step c). Preferably, the polyphenylene ether is added in step a). The poly-phenylene ether compound is preferably present in an amount of between 1 and 30% wt, based on amount of vinylarene.

Subsequent to the pre-polymerisation step, the pre-polymerised mass is suspended in an aqueous medium to yield suspended droplets. The volume ratio between the aqueous suspension medium and the pre-polymerised mass may vary between wide ranges, as will be appreciated by a person skilled in the art. Suitable volume ratios include 1:1 to 1:10 (pre-polymerised mass:aqueous phase). The optimal ratio is determined by economic considerations.

The suspension polymerisation can be improved by increasing the stability of the water-in-oil emulsion. This can be attained by usLng an aqueous medium containing one or more conventional stabilizing agents, such as polyvinylalcohol, gelatine, polyethyleneglycol, hydroxyethylcellulose, carboxymethylcellulose, poly-vinyl-pyrrolidone, polyacrylamide, but also salts of poly(meth)-acrylic acid, phosphonic acid or (pyro)-phosphoric acid, maleic acid, ethylene diamine tetracetic acid, as will be appreciated by the person skilled in the art. Suitable salts include the ammonium, alkali metal and alkaline earth metal salts. An advantageous example of such a salt is tricalcium phosphate. Preferably, the stabilizing agent is based on acrylic acid and/or methacrylic acid, optionally in combination with acrylic amide. The amount of the stabilizing agents may suitably vary from 0.05 to 1, preferably from 0.15 to 0.6% wt, based on the weight of the aqueous medium.

The free-radical initiator can be selected from the conventional initiators for free-radical styrene polymerisation. They include in particular organic peroxy compounds, such as peroxides, peroxycarbonates and peresters. Combinations of peroxy compounds can also be used. Typical examples of the suitable peroxy initiators are $C_6$–$C_{20}$ acyl peroxides such as decanoyl peroxide, benzoyl peroxide, octanoyl peroxy, stearyl peroxide, 3,5,5-trimethyl hexanoyl peroxide, peresters of $C_2$–$C_{18}$ acids and $C_1$–$C_5$ alkyl groups, such as t-butyl-perbenzoate, t-butylperacetate, t-butyl-perpivalate, t-butylperisobutyrate and t-butyl-peroxylaurate, and hydroperoxides and dihydrocarbyl ($C_3$–$C_{10}$)peroxides, such as diisopropylbenzene hydroperoxide, di-t-butyl peroxide, dicumyl peroxide or combinations thereof.

Radical initiators different from peroxy compounds are not excluded. A suitable example of such a compound is α,α'-azobisisobutyronitrile. The amount of radical initiator is suitably from 0.01 to 1% wt. based on the weight of the vinylarene monomer. The process is suitably initiated by heating the reaction mixture to elevated temperature, e.g., in the range of 40 to 140° C.

The polymerisation process may suitably be carried out in the presence of a chain transfer agent. The person skilled in the art will appreciate that these chain transfer agents can be selected from mercaptans, such as $C_2$–$C_{15}$-alkyl mercaptans, e.g. n-dodecylmercaptan, t-dodecylmercaptan, n-butyl mercaptan or t-butylmercaptan. Preferred are aromatic compounds such as pentaphenyl ethane, and in particular the dimer of α-methyl styrene.

The polymerisation can be further improved by increasing the stability of the suspension. Such a stability increase can be effected by incorporation of a polar polymer into the pre-polymerised mass in addition to the emulsifying agent already present. Examples of such polymers are polyvinylalcohol, gelatine, poly-ethyleneglycol, hydroxyethylcellulose, carboxymethylcellulose, polyvinylpyrrolidone, polyacrylamide, but also salts of poly (meth)acrylic acid, phosphonic acid or (pyro)phosphoric acid, maleic acid, ethylene diamine tetracetic acid. Suitable salts include the ammonium, alkali metal and alkaline earth metal salts. Preferably, the stabilizing polar polymer is based on acrylic acid and/or methacrylic acid, optionally in combination with acrylic amide.

Generally, the polar polymer will be incorporated by adding the polymer in process step a). The incorporation may be effected by mixing the polar polymer with the pre-polymerised mass, but it may also be incorporated in-situ by mixing the corresponding polar monomer with the vinylarene monomer and water and polymerising the polar monomer to yield the polar polymer desired. Subsequently, the polar polymer may be suspended together with the other components of the pre-polymerised mass. Another way to incorporate the polar polymer is to add the corresponding polar monomer to the pre-polymerised mass and subsequently polymerise the monomers to yield the polar polymer. The amount of polar polymer is suitably from 0.1 to 10% by weight, based on water emulsified.

The present invention has enabled the skilled artisan to prepare water-foamable particles that do not contain an organic foaming agent.

The polymer particles may further contain several additives or coatings in effective amounts. Such additives include dyes, fillers, stabilisers, flame retarding compounds, nucleating agents, antistatic compounds and lubricants. of particular interest are coating compositions containing glycerol- or metal carboxylates. Such compounds reduce the tendency of the particles to agglomerate. Suitable carboxylates are glycerol mono-, di- and/or tristearate and zinc stearate. Examples for such additive compositions are disclosed in GB-A-1,409,285. The coating compositions are deposited onto the particles via known methods e.g. via dry-coating in a ribbon blender or via a slurry or solution in a readily vaporising liquid.

The particles have advantageously an average diameter of 0.1 to 6 mm, preferably from 0.4 to 3 mm.

The expandable particles can be prefoamed by hot air or by using (superheated) steam, to yield particles having a reduced density, e.g. from 800 to 30 kg/m³. It will be appreciated that in order to vaporise the water included in the particles to effect foaming, the temperature must be higher than used for $C_3$–$C_6$ hydrocarbon foaming agents which have a lower boiling point than water. Foaming can also be effected by heating in hot air, in oil or by microwaves.

The invention will be further illustrated by means of the following example.

EXAMPLE

In a 2 litre vessel, 900 grams styrene containing 0.4% wt of dibenzoyl peroxide and 0.15% wt of tert-butyl perbenzoate, both based on amount of styrene, 100 ml distilled water, 10 g sodium styrene sulphonate as copolymerisable compound and 2.0 g trioctyl methyl ammonium chloride as phase transfer catalyst, were mixed and polymerised at 90° C. for 2.5 hours while stirring at 800 rounds per minute. The conversion degree of the pre-polymerised mass was about 55%. Subsequently, the prepolymerised mass was suspended in 3 litres distilled water containing 12 grams of a suspension stabilizer based on acrylic amide and acrylic acid. The polymerisation was continued for 5 hours at 90° C. and subsequently for 5 hours at 125° C. under a nitrogen pressure of 4 bar. Finally the system was cooled to room temperature and the solid polymer beads were separated off. The water content of the beads obtained was measured with the help of thermogravimetric analysis. The beads had a water content of 13.0% by weight of water, based on amount of polystyrene, copolymerised compound and water. The beads were expanded in hot air of 135° C. in a 500 ml glass vessel with the help of a hot air gun. The beads could be expanded to 24 times their original volume.

What is claimed is:

1. A process for the preparation of polymer particles containing a vinyl arene polymer comprising:
    a) forming a mixture comprising a vinyl arene monomer, from 0.001 to 5 weight % based on the weight of the vinyl arene monomer of a copolymerizable compound containing a polar moiety and a vinyl moiety and from 1 to 20 weight % based on the weight of the vinyl arene monomer of water;
    b) pre-polymerizing the mixture under agitation at rates up to 500 revolutions per minute at a temperature from 40° C. to 150° C. to a conversion of from 20 to 70% to form insitu an emulsifier and to emulsify the water in the pre-polymerized mixture;
    c) suspending the pre-polymerized mixture in water to form an oil in water suspension;
    d) polymerizing the resulting suspension at a temperature from 60° C. to 140° C.; and
    e) recovering the resulting polymer particles.

2. The process according to claim 1, wherein in step a) water is present in an amount from 3 to 15 weight % based on the weight of the vinyl arene monomer.

3. The process according to claim 2, wherein said copolymerizabie compound is comprised of a styrene compound with a polar moiety.

4. The process according to claim 3, wherein the vinyl arene monomer is styrene.

5. The process according to claim 4, wherein the mixture of step a) further includes from 0.01 to 1.5 weight % of a cross linking agent.

6. The process according to claim 4, wherein the mixture of step a) further includes from 1 to 30 weight % based on the weight of the vinyl arene monomer of polyphenylene ether.

7. The process according to claim 5, wherein the mixture of step a) further includes from 1 to 30 weight % based on the weight of the vinyl arene monomer of polyphenylene ether.

8. The process according to claim 4, further including mixing with the pre-polymerized mass of step b) from 0.1 to 10 weight % based on the weight of the emulsified water of a polar polymer.

9. The process according to claim 2, wherein the copolymerizable compound is comprised of a polar styrene derivative selected from the group consisting of styrene sulphonic acid and salts thereof.

* * * * *

UNITED STATES PATENT AND TRADEMARK OFFICE
CERTIFICATE OF CORRECTION

PATENT NO. : 6,242,540 B1
DATED : June 5, 2001
INVENTOR(S) : Crevecoeur et al.

It is certified that error appears in the above-identified patent and that said Letters Patent is hereby corrected as shown below:

<u>Title page,</u>
The PCT filing date should read -- July 3, 1997 --.

Signed and Sealed this

Twenty-sixth Day of March, 2002

Attest:

Attesting Officer

JAMES E. ROGAN
*Director of the United States Patent and Trademark Office*